(12) United States Patent
Xu et al.

(10) Patent No.: US 11,296,957 B2
(45) Date of Patent: Apr. 5, 2022

(54) NETWORK SLICE MANAGEMENT METHOD, UNIT, AND SYSTEM

(71) Applicant: Huawei Technologies Co., Ltd., Shenzhen (CN)

(72) Inventors: Ruiyue Xu, Shanghai (CN); Kai Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/574,565

(22) Filed: Sep. 18, 2019

(65) Prior Publication Data
US 2020/0014608 A1 Jan. 9, 2020

Related U.S. Application Data

(63) Continuation of application No. PCT/CN2017/077202, filed on Mar. 19, 2017.

(51) Int. Cl.
| H04L 12/24 | (2006.01) |
| H04L 29/12 | (2006.01) |
| H04L 41/5054 | (2022.01) |
| H04L 41/0806 | (2022.01) |
| H04L 41/08 | (2022.01) |

(Continued)

(52) U.S. Cl.
CPC ...... H04L 41/5054 (2013.01); H04L 41/0806 (2013.01); H04L 41/0886 (2013.01); H04L 41/5051 (2013.01); H04L 61/6068 (2013.01)

(58) Field of Classification Search
CPC ............. H04L 41/5054; H04L 41/0806; H04L 41/0886; H04L 41/5051; H04L 41/0893; H04L 41/0813; H04L 41/5019; H04L 41/5048; H04L 41/0843; H04L 41/0803;
(Continued)

(56) References Cited

U.S. PATENT DOCUMENTS 9,363,141 B1 * 6/2016 Buckley .............. H04L 41/0893
10,355,989 B1 * 7/2019 Panchai ................ H04L 12/467
(Continued)

FOREIGN PATENT DOCUMENTS

| CN | 104639653 A | 5/2015 |
| CN | 105282195 A | 1/2016 |

(Continued)

OTHER PUBLICATIONS

Lenovo Motorola Mobility, Network Slices in NFV Deployments, Jul. 11-15, 2016, SA WG2 Meeting, pp. 1-5 (Year: 2016).*

(Continued)

*Primary Examiner* — Glenton B Burgess
*Assistant Examiner* — Rachel J Hackenberg
(74) *Attorney, Agent, or Firm* — Conley Rose, P.C.

(57) ABSTRACT

A network slice template management method includes: receiving, by a first management unit, a subnet management request, where the subnet management request carries indication information of a subnet template; obtaining, by the first management unit, network service descriptor association information or a network service descriptor based on the indication information of the subnet template; and obtaining, by the first management unit, a network service instance based on the network service descriptor association information or the network service descriptor.

20 Claims, 11 Drawing Sheets

A first management unit receives a subnet management request, where the subnet management request carries indication information of a subnet template The first management unit obtains network service descriptor association information or a network service descriptor based on the indication information of the subnet template, where the indication information of the subnet template is used to obtain the subnet template The first management unit obtains a network service instance based on the network service descriptor association information or the network service descriptor

(51) Int. Cl.
  *H04L 41/5051* (2022.01)
  *H04L 101/668* (2022.01)

(58) Field of Classification Search
  CPC . H04L 61/6068; H04L 61/2007; H04L 61/20; H04L 61/30
  See application file for complete search history.

(56) References Cited

U.S. PATENT DOCUMENTS

| | | | | |
|---|---|---|---|---|
| 2015/0334696 | A1* | 11/2015 | Gu | H04L 61/2015 718/1 |
| 2015/0358399 | A1* | 12/2015 | Baugher | G06F 9/45558 709/203 |
| 2015/0363221 | A1* | 12/2015 | Terayama | G06F 9/45558 718/1 |
| 2016/0006623 | A1* | 1/2016 | Liu | H04L 43/0876 370/254 |
| 2016/0212017 | A1 | 7/2016 | Li et al. | |
| 2017/0054595 | A1* | 2/2017 | Zhang | H04L 41/12 |
| 2017/0070892 | A1* | 3/2017 | Song | H04W 48/20 |
| 2017/0141973 | A1* | 5/2017 | Vrzic | H04L 41/5051 |
| 2017/0222889 | A1 | 8/2017 | Zong et al. | |
| 2018/0004576 | A1 | 1/2018 | Gokurakuji et al. | |
| 2018/0191581 | A1 | 7/2018 | Yu et al. | |
| 2018/0239647 | A1* | 8/2018 | Tsai | H04L 41/5051 |
| 2018/0249530 | A1* | 8/2018 | Salkintzis | H04W 48/18 |
| 2018/0287894 | A1* | 10/2018 | Senarath | H04L 41/5019 |
| 2018/0317134 | A1* | 11/2018 | Leroux | H04W 24/02 |
| 2019/0191309 | A1* | 6/2019 | Kweon | H04W 80/10 |
| 2019/0327621 | A1* | 10/2019 | Chou | H04L 41/0896 |
| 2019/0386878 | A1* | 12/2019 | Chou | H04W 4/50 |
| 2020/0044919 | A1* | 2/2020 | Yao | H04L 41/0806 |

FOREIGN PATENT DOCUMENTS

| | | |
|---|---|---|
| CN | 106161174 A | 11/2016 |
| CN | 106341832 A | 1/2017 |
| EP | 3059900 A1 | 8/2016 |
| EP | 3249860 A1 | 11/2017 |
| KR | 20170107531 A | 9/2017 |
| WO | 2016117697 A1 | 7/2016 |
| WO | 2016118646 A1 | 7/2016 |
| WO | 2017035735 A1 | 3/2017 |

OTHER PUBLICATIONS

3GPP TR 28.801, V1.0.0, "3rd Generation Partnership Project; Technical Specification Group Services and System Aspects; Telecommunication management; Study on management and orchestration of network slicing for next generation network (Release 14)," XP051290419, Technical Report, Mar. 9, 2017, 52 pages.

3GPP TS 28.526 V1.0.0, "3rd Generation Partnership Project; Technical Specification Group Services and System Aspects; Telecommunication management; Life Cycle Management (LCM) for mobile networks that include virtualized networkfunctions; Procedures (Release 14)," Technical Specification, Mar. 2017, 36 pages.

Huawei, "Add potential solution for creating a network slice instance to support a communication service," 3GPP TSG SA WG5 (Telecom Management) Meeting #11Bis, XP051218994, Feb. 13-17, 2017, 2 pages.

* cited by examiner

NETWORK SLICE MANAGEMENT METHOD, UNIT, AND SYSTEM

CROSS-REFERENCE TO RELATED APPLICATIONS

This application is a continuation of International Patent Application No. PCT/CN2017/077202, filed on Mar. 19, 2017, the disclosure of which is hereby incorporated by reference in its entirety.

TECHNICAL FIELD

This application relates to the communications field, and in particular, to a network slice management method, a unit, and a system.

BACKGROUND

An inflexible network architecture of a conventional cellular network with a dedicated support system and IT system is very suitable for a network of an undiversified service type. However, this vertical architecture makes it difficult to extend a telecommunications network, and it is also difficult to adapt to changing user requirements and satisfy requirements of novel applications. In a future mobile communications system, a technology based on logic instead of physical resources is used, and a network is further abstracted into a network slice. This connectivity service is a function definition implemented using lots of custom software, such that operators can provide the network as a service for users. To be specific, operators can provide a physical network as a connectivity service in a form of network as a service, to satisfy wide requirements of people on more network cases.

A key to the network slice is network function virtualization (NFV). The NFV is to transfer software and hardware functions of a dedicated device in a network to a virtual host. Automatic deployment is a major feature of network slice management. The automatic deployment of the network slice is designing and planning a network offline to generate a network slice template and generating a network slice instance online in real time based on the network slice template. The network slice includes at least one network slice subnet, one network slice subnet includes at least one network service (NS), and one network service includes at least one virtualized network function (VNF). Therefore, the network slice instance includes at least one network slice subnet instance (NSSI), the network slice subnet instance includes at least one network service instance (NS Instance), and the network service instance includes at least one VNF instance. The network slice and the network slice subnet both include two parts: application (application configuration parameter) and virtual resource. An architecture of an NFV management and orchestration (MANO) system in other approaches is shown in FIG. 1A. A network function virtualization orchestrator (NFVO) unit can automatically deploy and manage a network service. For example, the NFVO automatically deploys an NS instance based on a network service descriptor (NSD). This includes instantiating a corresponding VNF instance and establishing a connection between VNF instances. Because the MANO can only instantiate the virtual resource part, an NS instance created by the NFVO includes only a virtual resource part of the network slice or of the network slice subnet.

In other approaches, resource requirement information of a network is manually specified to deploy a network instance, and then how to configure a service parameter is determined based on obtained network instance information. The network instance cannot be automatically deployed and the service parameter cannot be automatically configured to automatically provide a service. It can be learned that existing network instance deployment has a complex procedure and low deployment efficiency, and requires a lot of manual intervention.

SUMMARY

This application provides a network slice template management method and an apparatus, to resolve a problem that a lot of manual intervention is required due to complex deployment of an existing network instance.

According to a first aspect, this application provides a network slice template management method. The method includes: receiving, by a first management unit, a subnet management request, where the subnet management request carries indication information of a subnet template, and a first management unit may be a network slice subnet management function (NSSMF), a network slice management function (NSMF), or another management unit having an NSSMF or an NSMF function; obtaining, by the first management unit, network service descriptor association information or a network service descriptor based on the indication information of the subnet template; and obtaining, by the first management unit, a network service instance based on the network service descriptor association information or the network service descriptor. During implementation, the first management unit obtains network service instance information based on the network service descriptor association information or the network service descriptor, and then obtains the network service instance using the network service instance information. During specific implementation, that the first management unit obtains the network service instance based on the network service descriptor association information or the network service descriptor may mean that the first management unit obtains the network service instance information based on the network service descriptor association information or the network service descriptor.

With reference to the first aspect, in a first possible implementation, the first management unit may obtain the subnet template based on the indication information of the subnet template, and the subnet template includes the network service descriptor association information or the network service descriptor. The first management unit may alternatively obtain the subnet template in the following manners. For example, the first management unit locally stores a subnet template, and the first management unit finds the corresponding subnet template based on a locally maintained association relationship between indication information of a subnet template and the subnet template. Alternatively, the first management unit may access a subnet template stored in a database or a directory, to obtain the required subnet template.

It is found that a matched subnet template is locally stored, such that network instance deployment efficiency can be improved, and a latency caused by repeated searches is reduced.

With reference to the first aspect or the first possible implementation of the first aspect, in a second possible implementation of the first aspect, the subnet management request further carries subnet requirement information. The first management unit obtains the network service descriptor association information or the network service descriptor based on the subnet requirement information and the indication information of the subnet template.

With reference to the first aspect or the first or the second possible implementation of the first aspect, in a third possible implementation of the first aspect, the network service descriptor association information may include one or more of the following information: an identifier, a deployment specification, an instantiation level, vendor information, and version information of the network service descriptor.

With reference to any one of the first aspect or the first to the third possible implementations of the first aspect, in a fourth possible implementation of the first aspect, the first management unit creates a subnet instance or a managed object of a subnet instance based on the subnet template after receiving the subnet management request. Alternatively, the first management unit sends a creation request to a third management unit based on the subnet template, and the creation request is used to create a subnet instance or a managed object of a subnet instance. The third management unit may be a network management unit (also referred as to Network Manager, NM), an element management unit (also referred as to Element Manager, EM), a domain management unit (also referred as to Domain Manager, DM), or an operations support system (OSS). When the first management unit is an NSMF, the second management unit may be an NSSMF.

With reference to any one of the first aspect or the first to the fourth possible implementations of the first aspect, in a fifth possible implementation of the first aspect, the first management unit may associate the subnet instance with the network service instance. Alternatively, the first management unit associates the subnet instance with the managed object of the subnet instance. The subnet instance or the managed object of the subnet instance and the network service instance are automatically associated, such that a complete network instance can be deployed, and a service is provided.

With reference to any one of the first aspect or the first to the fifth possible implementations of the first aspect, in a sixth possible implementation of the first aspect, the first management unit configures network service instance information in the managed object. The network service instance information may include at least one of the following information: an identifier of the network service instance, a specification of the network service instance, and an instantiation level of the network service instance.

According to this application, the first management unit can automatically obtain the network service instance in a network instance creation process, thereby improving network slice deployment efficiency.

According to a second aspect, this application provides a network slice template management method. The method includes: receiving, by a first management unit, a subnet management request, where the subnet management request carries indication information of a subnet template; obtaining, by the first management unit, application information based on the indication information of the subnet template; and sending, by the first management unit, a subnet configuration request to a second management unit, where the subnet configuration request carries the application information.

With reference to the second aspect, in a first possible implementation of the second aspect, the first management unit obtains the subnet template based on the indication information of the subnet template, and the subnet template includes the application information. In this way, the first management unit obtains the application information. The subnet template herein may also be referred to as a network service descriptor, and the application information may be an application parameter, a configuration file, a managed object attribute value, or a script.

With reference to the second aspect or the first possible implementation of the second aspect, in a second possible implementation of the second aspect, the subnet configuration request further carries network service instance information. The network service instance information includes one or more of the following information: an identifier of a network service instance, a deployment specification of the network service instance, an instantiation level of the network service instance, an identifier of a virtualized network function instance, and a deployment specification of the virtualized network function instance.

With reference to the first or the second possible implementation of the second aspect, in a third possible implementation of the second aspect, the subnet template includes an association relationship between performance information and network service requirement information of the subnet template. The association relationship is used to determine the network service requirement information. The network service requirement information includes at least one of the following information: a deployment specification of a network service and an instantiation level of the network service. The network service requirement information is used to obtain the network service instance information.

With reference to any one of the first to the third possible implementations of the second aspect, in a fourth possible implementation of the second aspect, the subnet template includes network function requirement information and association information of the application information. The network function requirement information may include one or more of the following information: a virtualized network function descriptor (VNFD), virtualized network function requirement information (Virtualized Network Function Profile, or a VNF profile, which describes the virtualized network function requirement information), and a virtualized network function deployment specification (Virtualized deployment flavor ID, or a VNF flavor ID, which describes the virtualized network function deployment specification).

Compared with other approaches, according to this application, the first management unit can automatically deploy the application parameter in a creation process of the network service instance, thereby improving network slice deployment efficiency.

According to another aspect, an embodiment of the present disclosure provides a first management unit. The first management unit has a function of implementing operations of the first management unit in the foregoing method example. The function may be implemented by hardware, or may be implemented by hardware executing corresponding software. The hardware or software includes one or more modules corresponding to the foregoing function.

In a possible design, a structure of the first management unit includes a processor and a communications interface. The processor is configured to support the first management unit in performing the corresponding function in the foregoing method. Further, the first management unit may further include a memory. The memory is coupled to the processor and configured to store a program instruction and data that are necessary to the first management unit.

According to still another aspect, an embodiment of the present disclosure provides a communications system. The system includes the first management unit and the second management unit according to the foregoing aspect.

According to still another aspect, an embodiment of the present disclosure provides a computer storage medium, configured to store a computer software instruction used by the foregoing first management unit, and including a program designed for executing the foregoing aspect.

Compared with other approaches, the embodiments of this application disclose the network slice template management method. The method includes: receiving, by the first management unit, the subnet management request, where the subnet management request carries the indication information of the subnet template; obtaining, by the first management unit, the network service descriptor association information or the network service descriptor based on the indication information of the subnet template; and obtaining, by the first management unit, the network service instance based on the network service descriptor association information or the network service descriptor. According to the network slice template management method provided in this application, the first management unit can automatically obtain the network service instance in the network instance creation process, thereby improving the network slice deployment efficiency.

DESCRIPTION OF EMBODIMENTS

The following describes the technical solutions in the embodiments of the present disclosure with reference to the accompanying drawings in the embodiments of the present disclosure.

Figure 1:
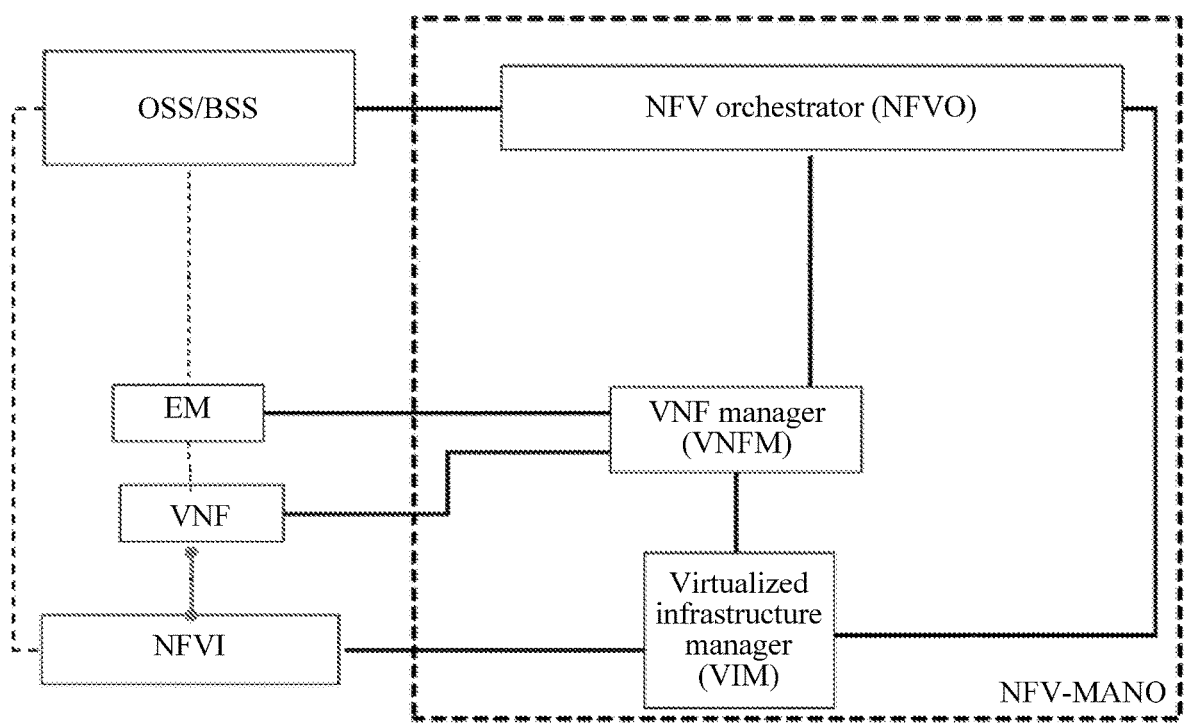
FIG. 1 is a schematic diagram of a network architecture of an NFV MANO.

FIG. 1 is a schematic diagram of a possible application scenario according to an embodiment of the present disclosure. The application scenario shown in FIG. 1 includes at least a service orchestrator (SO) unit, a network orchestrator (NO) unit, an element manager (EM) unit, a network unit/network function (NF) unit, a network function virtualization orchestrator (NFVO), and a virtualized network function manager (VNFM). The units in FIG. 1 are briefly described below.

The SO unit may also be referred to as a service orchestration and management unit or a service management unit. Functions of the SO unit mainly include: performing life cycle management (for example, instantiation, update, or deletion) on a service based on a service request message; service aggregation; service management, for example, fault, configuration, accounting, performance, and security management of a service (e.g., Fault, Configuration, Accounting, Performance, and Security (FCAPS)); mapping between a service and a network slice; and the like. The service may be a group of communications services, for example, a mobile broadband (MBB) service, a voice service, and an Internet of Things (IoT) service (for example, an intelligent parking service or an intelligent meter reading service), that can be received by a user and that is of a specified service level agreement (SLA). For example, the SO unit may manage a service carried by a network slice.

The NO unit may also be referred to as a network orchestration and management unit or a network management unit. Functions of the NO unit mainly include: management of a network slice, for example, life cycle management of the network slice or management of a network slice template; mapping between a network slice and a network function; coordination of different types of network resources; coordination of network resources provided by different operators or different network suppliers, which enables the network resources provided by the different network suppliers to satisfy a requirement of a target service, for example, an SLA requirement, a requirement on a key performance indicator (KPI), or a requirement on quality of service (QoS); centralized orchestration of network devices provided by different suppliers; and provision of an external application programming interface (API). The API is configured to provide a network function for a third party, to implement inter-operator deployment.

The EM unit may also be referred to as a network function management unit (also referred as to Network Function Manager (NF-M)). Functions of the EM unit mainly include: life cycle management (for example, instantiation, update, or deletion) of a network element or a network function; FCAPS management of a network element or a network function; and the like.

The network unit may include at least one of a core network unit, an access network unit, or a transport network unit. It should be noted that the network unit may be replaced with a network function unit. Alternatively, the network unit may also have a function of a network function unit. A "Network/NF" unit shown in FIG. 1 indicates a unit having both a function of the network unit and/or a function of a network function unit.

Main functions of the network function virtualization orchestrator (NFVO) include, but are not limited to: being responsible for allocation, scheduling, management, and orchestration of a virtual resource; and being responsible for life cycle management, fault management, performance management, and configuration management of a network service (NS).

Main functions of the virtualized network function manager (VNFM) include, but are not limited to, being responsible for allocation, scheduling, management, and orchestration of a virtual resource; and being responsible for life cycle management of a virtualized network function (VNF).

A VIM may provide an interface for upper-layer software, perform life cycle management, scheduling, allocation, loading, upgrade, and the like on a virtual resource, and manage a dedicated hardware device for carrier-grade data transmission, encryption and decryption, and the like.

In terms of a theoretical level of a network functions virtualization infrastructure solution (NFVI), the NFVI is a group of resources used to host and connect virtual functions. For example, the NFVI is a cloud data center including a server, a virtualized management program (hypervisor), an operating system, a virtual machine, a virtual switch, and a network resource.

It should be noted that the SO unit or the NO unit may be deployed in an operations support system (OSS). The SO unit or the NO unit may alternatively be deployed independent of the OSS. The OSS may be construed as a device-oriented and network maintenance-oriented support system, and is responsible for network management of a single vendor and network management of a plurality of vendors.

It may be understood that the foregoing function descriptions of the units are merely some examples. The units may further have other functions. This is not limited in the embodiments of the present disclosure.

For ease of description, a unit may be represented below by an English abbreviation of the unit. For example, the SO unit may be represented by SO. Indication of another unit is similar, and details are not described subsequently.

Figure 2:
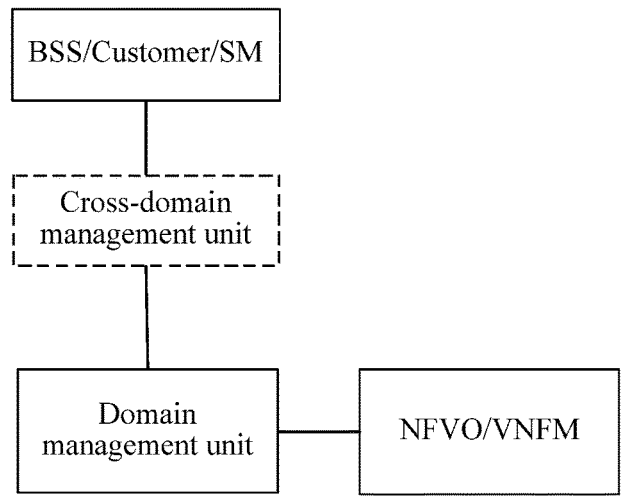
FIG. 2 is a schematic diagram of a possible network architecture according to an embodiment of the present disclosure.

Based on the foregoing application scenario, FIG. 2 shows a possible network architecture according to an embodiment of the present disclosure. As shown in FIG. 2, the network architecture includes a business support system (BSS)/service management unit (also referred to as Service Management Function), a cross-domain management unit (also referred to as a network slice management function (NSMF)), a domain management unit (also referred to as a network slice subnet management function (NSSMF)). The NSSMF includes a core network domain management unit (also referred to as Core Network Domain Manager (CN-DM)), an access network domain management unit (also referred to as Access Network Domain Manager (AN-DM)), a transport network domain management unit (also referred to as Transport Network Domain Manager (TN-DM)), and the like. For example, the access network domain management unit may be a radio access network (RAN) domain management unit (or RAN Domain Manager (RAN-DM)).

Optionally, the domain management unit may alternatively include and implement any two or all of the core network domain management unit, the access network domain management unit, and the transport network domain management unit.

The BSS, the NSMF, the NSSMF (including the CN-NSSMF, the AN-NSSMF, and the TN-NSSMF) are separately described below briefly.

The BSS/SM is responsible for service-related management (for example, including service operation, accounting, and customer relationship management), and provides a service for a terminal. In the network architecture shown in FIG. 2, the BSS may alternatively be replaced with a customer. Alternatively, the BSS may also have a function of a customer. Functions of the customer include service management and providing a corresponding service for a terminal. In FIG. 2, "BSS/Customer" indicates a unit having a function of the BSS and/or the function of the customer.

The NSMF, or the network slice management unit, may also be referred to as a cross-domain slice management unit (also referred as to Cross-Domain Slice Manager (CDSM)), and has a management function of a network slice (NSL) and/or an orchestration function of an NSL. For example, the NSMF may include some or all of the following functions: NSL management, for example, life cycle management of a network slice, management of a network slice template, fault management of a network slice, performance management of a network slice, and configuration management of a network slice; mapping between an NSL and a subnet and mapping between an NSL and a network function; coordination of network resources provided by different child domains (for example, a core network domain, an access network domain, or a transport network domain) or service level agreement (SLA) information; and centralized orchestration of subnet slices and network functions that are provided by child domains. The centralized orchestration can enable the subnet slices or the network functions that are provided by the child domains to satisfy a requirement (for example, an SLA requirement, a requirement on a key performance indicator (KPI), or a requirement on quality of service (QoS)) of a target service.

The foregoing network slice may also be referred to as an end to end (E2E) network slice, includes at least one subnet, and may include at least a core network (CN) part, an access network (AN) part, or a transport network (TN) part. Alternatively, the network slice may include any two of a CN part, an AN part, or a TN part. Alternatively, the network slice may represent a network slice of a CN part, a network slice of an AN part, or a network slice of a TN part. The foregoing access network may be a radio access network (RAN). It may be understood that the network slice in the embodiments of the present disclosure may have another implementation. This is not limited in the embodiments of the present disclosure.

The NSSMF, or the network slice subnet management unit, may also be referred to as a subnet management unit or a domain management unit. For brevity, a network slice subnet in this specification is collectively referred to as a subnet, and the network slice subnet management unit is collectively referred to as a subnet management unit. The subnet is a logical network, and is a set of one or more network functions. Optionally, one subnet may include only a network function or a network element of a core network. Alternatively, one subnet includes only a network function of an access network. Alternatively, one subnet includes a network function or a network element of a transport network. Alternatively, one subnet includes two or all of a network function of an access network, a network function of a core network, and a network function of a transport network. The subnet management unit has a function of subnet management, orchestration, or design, and includes life cycle management (including creation, update, deletion, or the like) of a subnet, fault management of the subnet, performance management of the subnet, configuration management of the subnet, and the like; life cycle management of a service corresponding to the subnet, fault management of the service, performance management of the service, configuration management of the service, and the like; and coordination of a network resource in the subnet for centralized orchestration.

The CN-NSSMF, or the core network subnet management unit, has a subnet management function in a domain of a core network and/or a subnet orchestration function in a domain of a core network. For example, the CN-NSSMF may include some or all of the following functions: management of a subnet of a network slice in the domain of the core network, for example, including life cycle management (including creation, update, deletion, or the like) of the subnet, fault management of the subnet, performance management of the subnet, and configuration management of the subnet; management of a service in the domain of the core network, for example, including life cycle management of the service, fault management of the service, performance management of the service, and configuration management of the service; and coordination of a network resource in the domain of the core network for centralized orchestration.

The AN-NSSMF unit has a subnet management function in a domain of an access network and/or a subnet orchestration function in a domain of an access network. For example, the AN-NSSMF may include some or all of the following functions: management of a subnet in the domain of the access network, for example, including life cycle management (including creation, update, deletion, or the like) of the subnet, fault management of the subnet, performance management of the subnet, and configuration management of the subnet; management of a service in the domain of the access network, for example, including life cycle management of the service, fault management of the service, performance management of the service, and configuration management of the service; and coordination of a network resource in the domain of the access network for centralized orchestration.

The TN-NSSMF unit has a subnet management function in a domain of a transport network and/or a subnet orchestration function in a domain of a transport network. For example, the TN-NSSMF may include some or all of the following functions: management of a subnet in the domain of the transport network, for example, including life cycle management (including creation, update, deletion, or the like) of the subnet, fault management of the subnet, performance management of the subnet, and configuration management of the subnet; management of a service in the domain of the transport network, for example, including life cycle management of the service, fault management of the service, performance management of the service, and configuration management of the service; and coordination of a network resource in the domain of the transport network for centralized orchestration.

The NSMF, the CN-NSSMF, the AN-NSSMF, and the TN-NSSMF may all be deployed in the SO or deployed in the NO. Alternatively, the NSMF may be deployed in the NO, and the CN-NSSMF, the AN-NSSMF, and the TN-NSSMF may all be deployed in the EM. Alternatively, the NSMF may be deployed in the SO, and the CN-NSSMF, the AN-NSSMF, and the TN-NSSMF may all be deployed in the NO. Alternatively, none of the NSMF, the CN-NSSMF, the AN-NSSMF, and the TN-NSSMF are deployed in the NO or the SO.

In addition, the network slice subnet management unit may be a domain management unit managing a single subnet, or may be a domain management unit managing a hybrid subnet. In the latter case, a subnet managed by the domain management unit may include any two or all of the CN, the AN, or the TN.

The solutions of this application are described below based on common aspects of the embodiments of this application.

Figure 3:
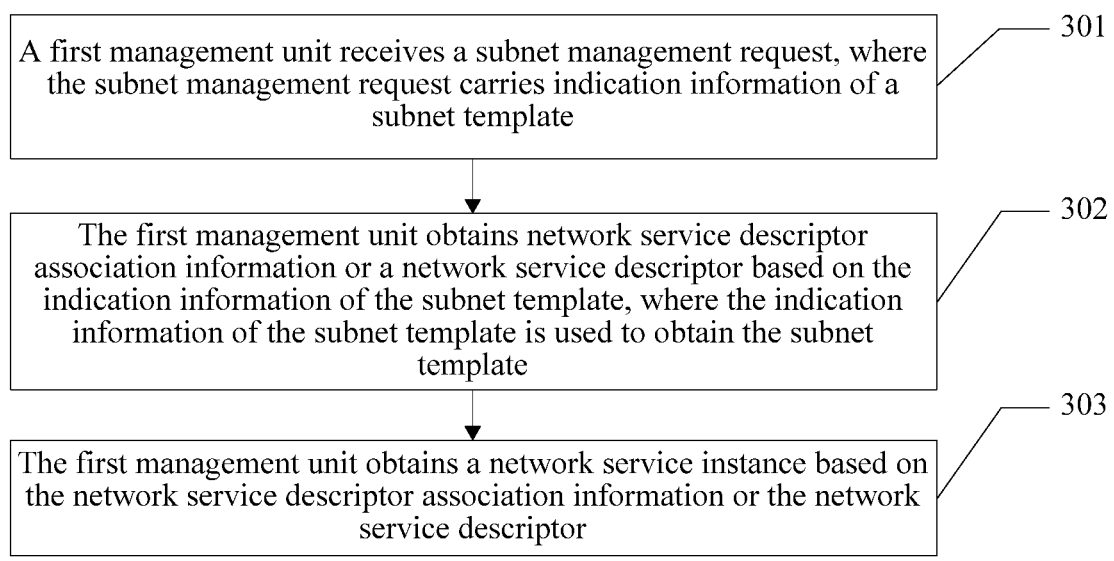
FIG. 3 is a schematic flowchart of a network slice template management method according to an embodiment of the present disclosure.

As shown in FIG. 3, an embodiment of this application provides a network slice template management method, including the following steps.

S301: A first management unit receives a subnet management request, where the subnet management request carries indication information of a subnet template.

The first management unit may be a network slice subnet management function (NSSMF), a network slice management function (NSMF), or any management unit having an NSSMF or an NSMF function. The indication information of the subnet template is used to obtain the subnet template.

Optionally, the first management unit locally stores the subnet template.

Optionally, a database or a directory that can be accessed by the first management unit stores the subnet template.

S302: The first management unit obtains network service descriptor association information or a network service descriptor based on the indication information of the subnet template.

S303: The first management unit obtains a network service instance based on the network service descriptor association information or the network service descriptor.

The first management unit may send, to an NFVO, a request for creating the network service instance. The request carries the network service descriptor association information or the network service descriptor. After creating the corresponding network service instance, the NFVO sends the network service instance information to the first management unit. For example, obtaining the network service instance is obtaining the network service instance information.

Optionally, the first management unit first sends a network service descriptor loading request to the NFVO, and then sends a network service creation request to the NFVO. The request carries the network service descriptor association information.

Optionally, that the first management unit sends the network service creation request to the NFVO includes: the first management unit sends a network service instance identifier creation request to the NFVO, and then sends an instantiation request to the NFVO.

Another feasible solution is: The first management unit may search a live network for whether there is an available network service instance. If determining that there is an available network service instance, the first management unit may use the network service instance.

The first management unit determines, based on the network service descriptor or the network service descriptor association information and locally pre-stored network service instance information, whether there is an available network service instance.

Optionally, the first management unit sends a network service instance information query request to the NFVO. The request carries the network service descriptor association information or the network service descriptor. If available network service instance information is returned, a network service instance using the information is determined.

Therefore, according to this embodiment of the present disclosure, the first management unit can automatically obtain the network service instance in a network instance creation process, thereby improving network slice deployment efficiency.

FIG. 4 to FIG. 7 separately show implementation solutions of a network slice template according to this application. These solutions are further described below with reference to FIG. 4 to FIG. 7.

Figure 4:
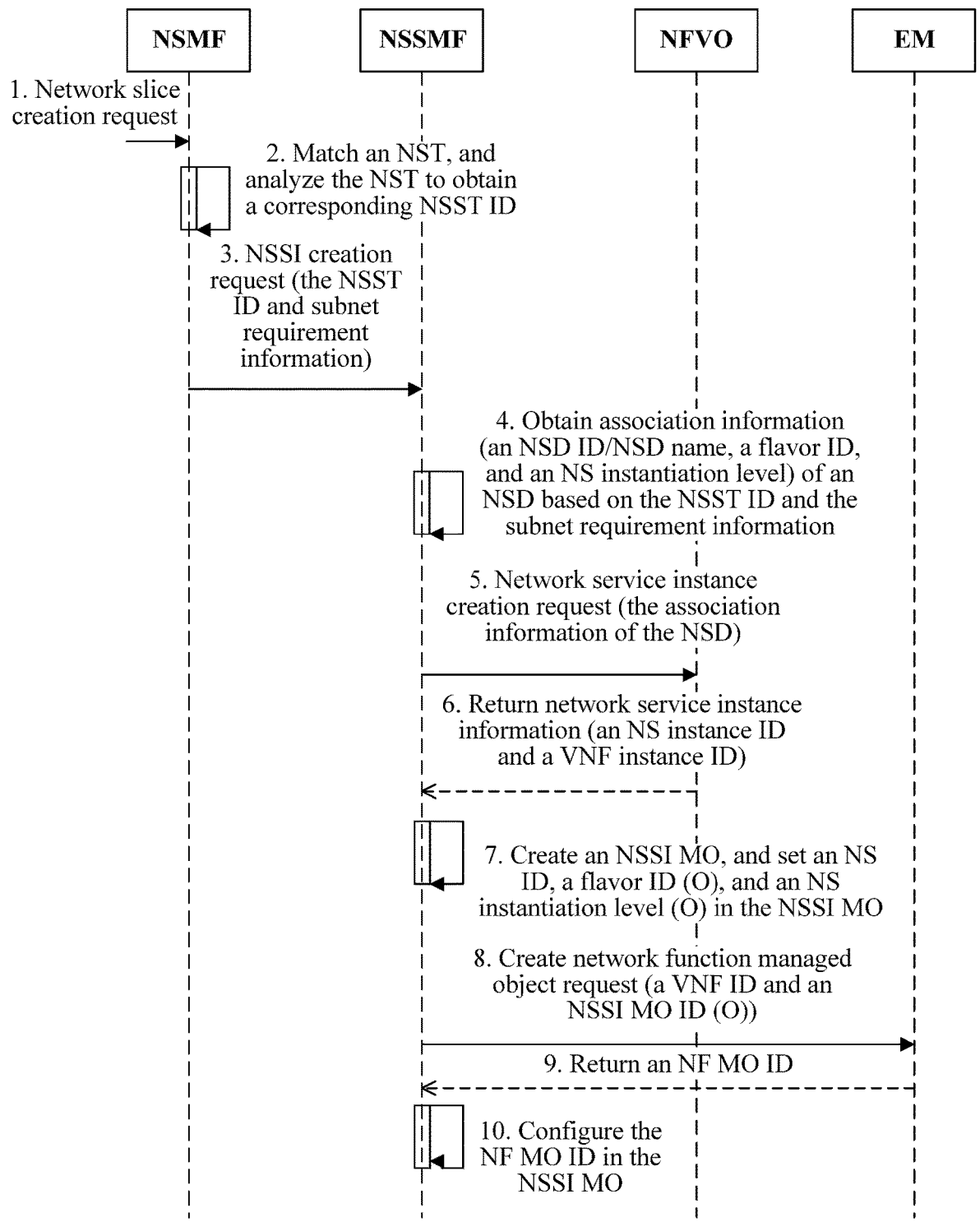
FIG. 4 is a schematic communication diagram of another network slice management method according to an embodiment of the present disclosure.

FIG. 4 shows an implementation solution of a network slice template according to this application. The accompanying drawing involves the following network elements: an NSMF, an NSSMF, an NFVO, and an EM. It should be noted that the network elements are merely intended to describe functions of the network elements as an example. In a process, some functions of each network element may be implemented using another network element. For example, some functions of the NSMF may be implemented using the NSSMF.

An implementation is as follows.

401: The NSMF receives a network slice creation/allocation/instantiation request or a service request. The request carries network slice requirement information. The network slice requirement information herein includes a service type or a network slice type (for example, Enhanced Mobile Broadband (eMBB), massive Machine Type Communication (mMTC), a service SLA, or a network KPI (for example, a latency). A SLA requirement of a service or the network KPI may include at least one of the following: a latency, a report success ratio, a command success ratio, coverage, a capacity, reliability, or a throughput. The report success ratio may be a ratio of sending success of an uplink packet, and the delivery success ratio may be a ratio of sending success of a downlink packet. The coverage may refer to a distribution area of a terminal. The capacity may refer to a quantity of terminals that can be accommodated.

Optionally, the network slice requirement information further carries an identifier or a name of a network slice template. The network slice template is used to deploy a network slice instance. The name of the network slice template may be a network slice descriptor or a network slice blueprint. The identifier or the name of the network slice template is not limited herein.

402: The NSMF searches for a corresponding network slice template based on the network slice requirement information or an identifier of an NST, where the network slice template is pre-loaded to the NSMF or a database that can be accessed by the NSMF.

For example, the NSMF searches for the corresponding network slice template based on the network slice type, and different network slice types correspond to different network slice templates.

The NSMF analyzes the network slice template, and obtains an identifier or a name of a required subnet template NSST. The network slice template includes an identifier or a name of at least one subnet template. Optionally, the network slice template may further include an identifier or a name of an NSSMF corresponding to the subnet template.

The NSMF decomposes the network slice requirement information into subnet requirement information. In an example, the network slice requirement information may include a total-latency and a total-report success ratio. For ease of description, the total-report success ratio below is represented by a total-ratio. Other content related to the report success ratio may also be similarly represented, and details are not described subsequently. For example, the total latency=10 milliseconds (ms), and the total-ratio=96%.

That the NSMF decomposes the network slice requirement information into the subnet requirement information includes the following.

In an example, CN subnet requirement information includes a CN-latency and a CN-ratio, RAN subnet requirement information includes a RAN-latency and a RAN-ratio, and transport subnet requirement information includes a TN-latency and a TN-ratio. For example, the CN-latency=3 ms, the RAN-latency=2 ms, the TN-latency=5 ms, and the CN-ratio×the RAN-ratio×the TN-ratio=96%.

403: The NSMF sends a subnet management request to the corresponding NSSMF, where the subnet management request carries an identifier of an NSST and corresponding subnet requirement information, and the subnet management request herein may be any one of a creation request, an instantiation request, or a management request.

404: The NSSMF obtains the corresponding NSST based on the identifier of the NSST, and obtains association information of an NSD based on the subnet requirement information, where the association information of the NSD includes at least one of the following information: a network service descriptor (NSD) identifier (ID) or name (NSD ID/NSD name), a network service deployment specification (an NS flavor ID, which describes the network service deployment specification), a network service (NS) instantiation level, and the like.

For example, as shown in FIG. 4, the NSST includes association information of NSDs that corresponds to different subnet requirement information. Only association information of an NSD corresponding to the corresponding subnet requirement information needs to be matched herein.

Optionally, the NSSMF obtains the association information of the NSD based on the identifier of NSST and/or the subnet requirement information and a locally maintained association relationship between an identifier of an NSST and association information of an NSD.

405: The NSSMF sends an NS creation request to the NFVO, where the request carries the association information of the NSD. For example, the NSSMF may send a create NS identifier request to the NFVO, where the request carries the NSD ID, obtain an NS instance ID, and then send an NS instantiation request to the NFVO, where the request carries the NS flavor ID, the NS instantiation level, or the like.

406: After creating a corresponding NS instance, the NFVO returns corresponding network service instance information (NS instance info) (for example, an NS instance ID or a VNF instance ID).

407: The NSSMF associates a subnet instance with a network service instance.

The NSSMF maintains an association relationship between an identifier of a subnet instance and an NS instance ID. Optionally, in addition to the NS instance ID, the NSSMF may further maintain an association relationship between an identifier of a subnet instance and an NS flavor ID, an NS instantiation level, and the like.

Alternatively, the NSSMF creates a managed object (MO) of a network slice subnet instance NSSI (where the subnet instance in this specification is equal to the network slice subnet instance). The NS instance ID is configured in the MO. Optionally, parameters such as the NS flavor ID and the NS instantiation level further need to be configured.

408: The NSSMF sends a create NF MO request to the EM, where the request carries the VNF instance ID, and optionally, the request further carries an NSSI MO ID or an NSSI ID.

409: The EM creates an NF MO, configures the VNF instance ID in the NF MO, optionally configures the NSSI MO ID, and returns an NF MO ID to the NSSMF.

410: The NSSMF configures the NF MO ID in an NSSI MO.

The NSSMF obtains network service descriptor association information based on the shown subnet requirement information and the subnet identifier, sends the network service descriptor association information to the NFVO to obtain the corresponding network service instance, and configures a service parameter, to complete automatic deployment of the subnet instance.

Figure 5:
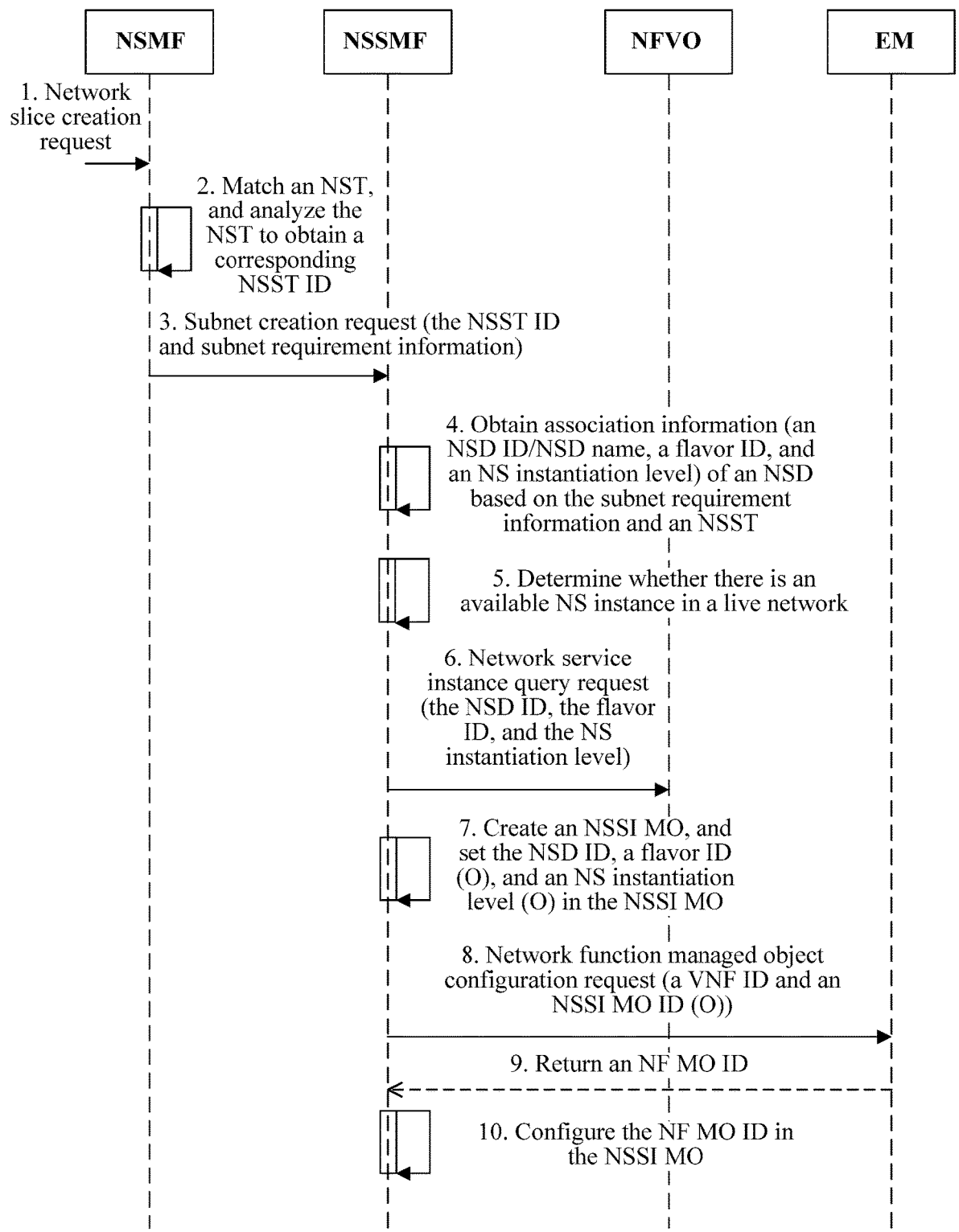
FIG. 5 is a schematic communication diagram of still another network slice management method according to an embodiment of the present disclosure.

FIG. 5 shows another implementation solution of a network slice template according to this application. A main difference between this embodiment and the foregoing embodiment is that an NSSMF first searches a live network for whether there is an available network service instance (NS instance). If finding a matching network service instance, the NSSMF may use the existing network service instance.

Compared with the solution provided in the foregoing embodiment, an existing network service instance may be reused, to improve utilization of a virtual resource.

The following provides descriptions with reference to FIG. 5. For steps the same as or similar to those in the foregoing embodiment, details are not described in this embodiment again.

For implementations of 501 to 504, refer to steps 401 to 404 in the foregoing embodiment.

505: The NSSMF determines, based on the obtained association information of the NSD, whether there is an available NS instance in a live network. Network service instance information is locally maintained in the NSSMF. The network service instance information may include an NS instance ID, an NSD ID, a flavor ID, an NS instantiation level, and the like. The NSSMF determines whether the association information of the NSD matches the network service instance information, and if the association information of the NSD matches the network service instance information, uses the existing NS instance.

For example, it may be determined, based on whether the association information of the NSD is consistent with the locally maintained NS instance information, whether the association information of the NSD matches the network service instance information. If the association information of the NSD is consistent with the locally maintained NS instance information, it is considered that the association information of the NSD matches the network service instance information. If the association information of the NSD is inconsistent with the locally maintained NS instance information, it is considered that the association information of the NSD does not match the network service instance information.

Optionally, step 506 is performed.

506: The NSSMF sends an NS instance query request to the NFVO, where the request carries the association information of the NSD, including the NSD ID, the flavor ID, and the NS instantiation level, and the NFVO determines, based on the association information of the NSD, whether there is locally an available NS instance, and returns an available NS instance ID.

It should be noted that step 505 and step 506 are not performed in a particular order. Alternatively, step 505 may be first performed. When no available NS instance is locally found, step 506 is performed.

For implementations of 507 to 510, refer to steps 407 to 410 in the foregoing embodiment. Details are not described herein again.

An existing network service instance is reused, to improve utilization of a virtual resource.

Figure 6:
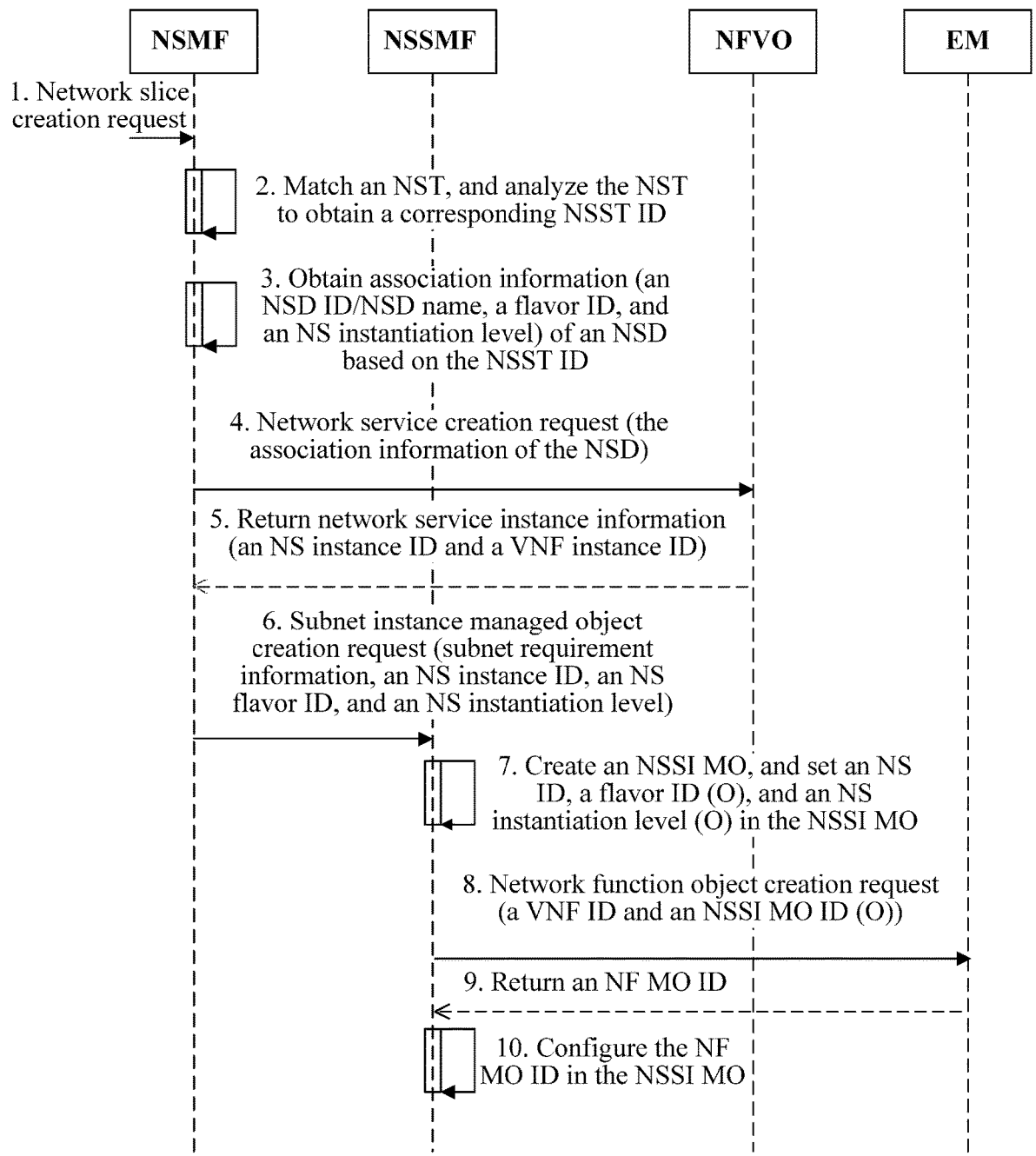
FIG. 6 is a schematic communication diagram of still another network slice management method according to an embodiment of the present disclosure.

FIG. 6 shows an implementation solution of a network slice template according to this application. A main difference between this embodiment and the foregoing embodiment is that interaction bodies in this embodiment are changed into an NSMF and an NFVO that interact with each other.

The following provides descriptions with reference to FIG. 6. For steps the same as or similar to those in the foregoing embodiment, details are not described in this embodiment again.

For implementations of 601 and 602, refer to steps 401 and 402 in the foregoing embodiment.

For an implementation step of 603, refer to step 403 in the foregoing embodiment. A difference is that interaction bodies are changed into an NSMF and an NFVO.

For implementations of 604 and 605, refer to steps 404 and 405 in the foregoing embodiment. A difference is that interaction bodies are changed into the NSMF and the NFVO.

606: The NSMF sends an NSSI creation request or an NSSI MO creation request to the NSSMF, where the request carries network service instance information, and the network service instance information includes one or more of the following information: an NS instance ID, an NS flavor ID, or an NS instantiation level.

For implementations of 607 to 610, refer to steps 407 to 410 in the foregoing embodiment. Details are not described herein again.

The NS instance information is centrally managed using the NSMF, such that utilization of a network service instance is maximally ensured.

Figure 7:
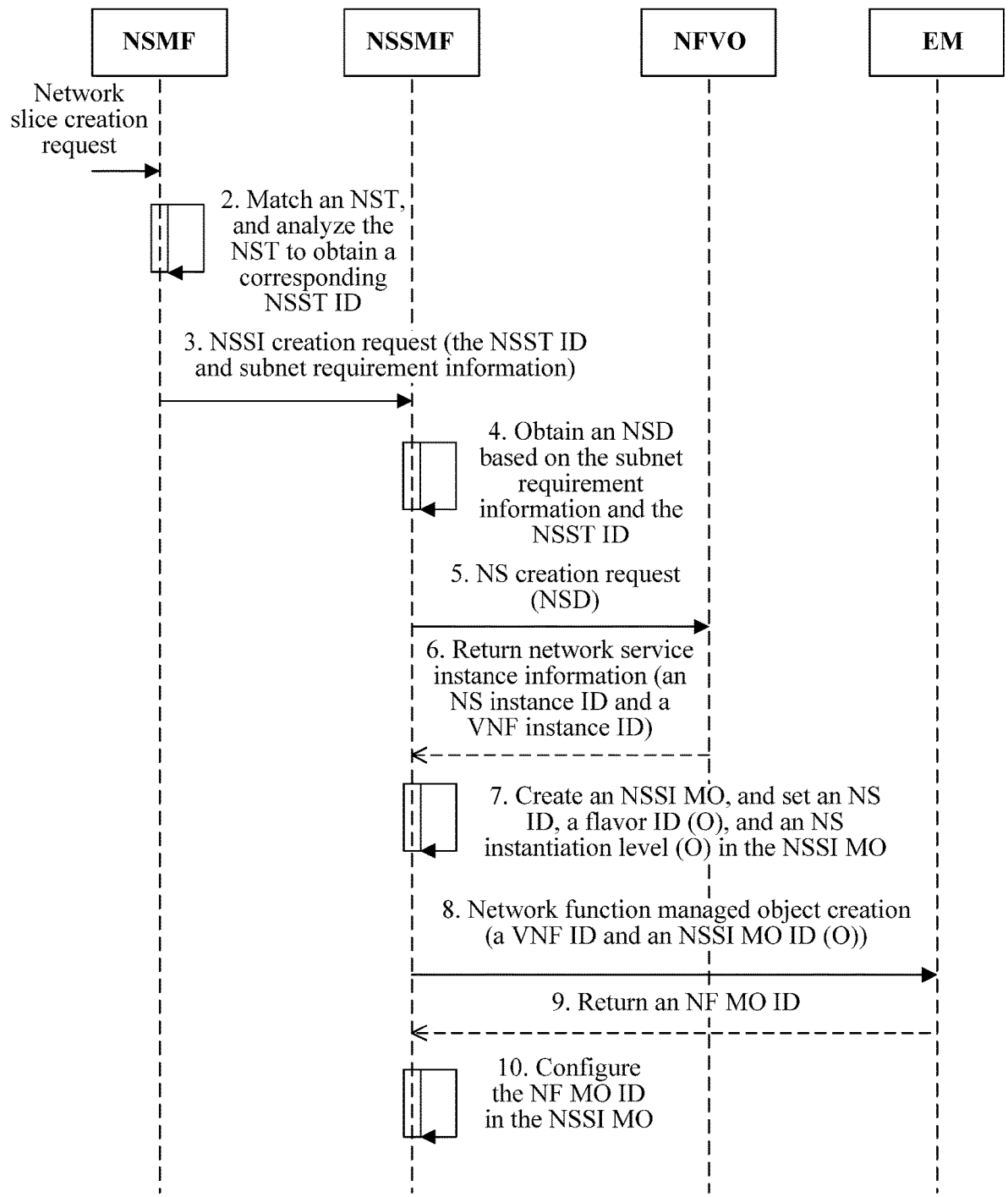
FIG. 7 is a schematic communication diagram of still another network slice management method according to an embodiment of the present disclosure.
Figure 7A:
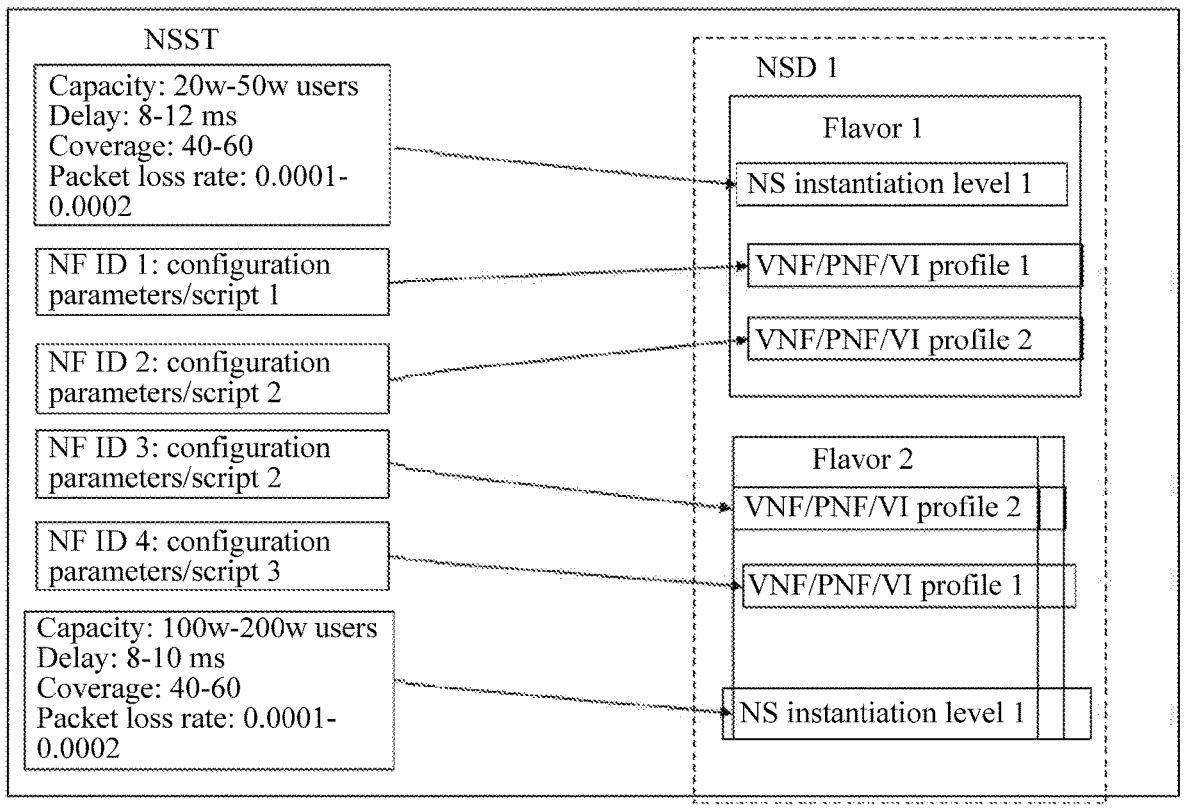
FIG. 7A is a schematic diagram of a subnet template according to an embodiment of the present disclosure.

FIG. 7A shows an implementation solution of a network slice template according to this application. An implementation is as follows.

A network slice subnet provider provides a subnet template NSST, and the NSST includes information about an NSD. The following is an example in which the NSST includes the information about the NSD.

A subnet designer or operator loads/uploads the NSST to an NSSMF, a database that can be accessed by the NSSMF, or a database that can be accessed by both the NSSMF and an NFVO.

For implementations of 701 to 703, refer to steps 401 to 403 in the foregoing embodiment.

704: The NSSMF obtains the corresponding NSST based on the identifier of the NSST, and obtains an NSD based on the NSST subnet requirement information.

For example, as shown in FIG. 7A, the NSST includes information about NSDs that corresponds to different values of the subnet requirement information. Only an NSD corresponding to the corresponding subnet requirement information needs to be matched herein.

The information about the NSD includes at least one of the following information: a virtualized network function descriptor (VNFD), a virtualized link descriptor (VLD), a physical network function descriptor (PNFD), a virtualized network function forward graph descriptor (VNFFGD), a flavor ID, an NS instantiation level, VNF requirement information (a VNF profile, which describes the VNF requirement information), PNF requirement information (a PNF profile, which describes the PNF requirement information), and VL link information (a VL profile, which describes the VL link information).

Optionally, the NSST further includes at least one of the following: an association relationship between a VNFD and an application parameter, an association relationship between a PNFD and an application parameter, an association relationship between a VLD and an application parameter, an association relationship between a VNFFGD and an application parameter, an association relationship between a VNF profile and an application parameter, an association relationship between a PNF profile and an application parameter, and an association relationship between a VL profile and an application parameter.

For example, an association relationship between A and B herein means that A and B are in a same data architecture, a data architecture of A includes information (for example, an identifier) about B, or a data architecture of B includes information (for example, an identifier) about A.

The foregoing application parameter may alternatively refer to a configuration script or a file of the application parameter.

Optionally, the NSST further includes an association relationship between a performance parameter (for example, a SLA or a KPI) and a flavor ID and/or an association relationship between a performance parameter (for example, a SLA or a KPI) and an NS instantiation level.

For example, an association relationship between A and B herein means that A and B are in a same data architecture, a data architecture of A includes information (for example, an identifier) about B, or a data architecture of B includes information (for example, an identifier) about A.

705: The NSSMF sends an NSD creation request to the NFVO, where the request carries the NSD. For example, the NSSMF may first send an NSD loading request to the NFVO; then send a create NS identifier request to the NFVO, where the request carries an NSD ID; obtain an NS instance ID; and send an NS instantiation request to the NFVO, where the request carries a flavor ID, an NS instantiation level, or the like.

For implementations of 706 to 710, refer to steps 406 to 410 in the foregoing embodiment. Details are not described herein again.

The NSST includes the information about the NSD, such that an NS instance is automatically deployed in a subnet deployment process, thereby implementing automatic network slice deployment.

Figure 8:
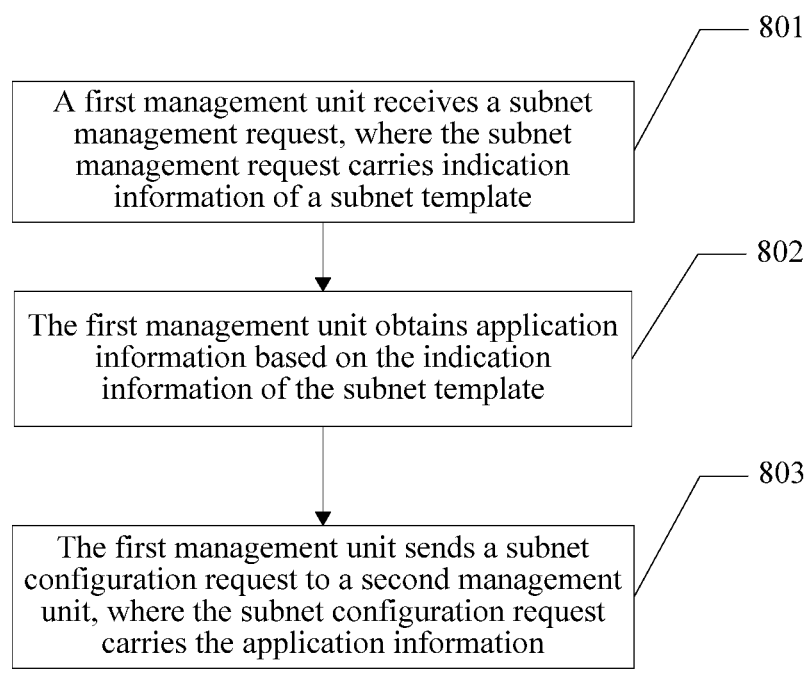
FIG. 8 is a schematic flowchart of still another network slice management method according to an embodiment of the present disclosure.

FIG. 8 shows an implementation solution of a network slice template according to this application, including the following steps.

S801: A first management unit receives a subnet management request, where the subnet management request carries indication information of a subnet template. It should be noted herein that the first management unit is an NSSMF and a second management unit is a DM or a network function management unit (for example, an EM). Alternatively, when the first management unit is an NFVO, the second management unit is an NSSMF.

S802: The first management unit obtains application information based on the indication information of the subnet template.

An optional implementation is as follows. The first management unit obtains the subnet template based on the indication information of the subnet template. The subnet template includes the application information. In this way, the first management unit obtains the application information.

Optionally, the application information herein may be a configuration file or a script.

Optionally, the subnet template herein may also be referred to as a network service descriptor.

Optionally, the subnet template includes the at least one association relationship between application information and network service requirement information (a flavor ID and/or an NS instantiation level).

Optionally, the subnet template includes at least one association relationship between application information and network function information. The network function information herein may be a VNFD, a VNF profile, a PNFD, or a PNF profile.

For example, an association relationship between A and B herein means that A and B are in a same data architecture, a data architecture of A includes information (for example, an identifier) about B, or a data architecture of B includes information (for example, an identifier) about A.

S803: The first management unit sends a subnet configuration request to a second management unit, where the subnet configuration request carries the application information.

Optionally, the subnet configuration request may further carry network service instance information (an NS instance ID).

Optionally, the subnet template further includes at least one piece of association relationship between network function requirement information and application information.

It should be noted that when a subnet is described, mentioned application information is application information for the entire subnet. When a network function is described, mentioned application information is application information for the specified network function.

Figure 8A:
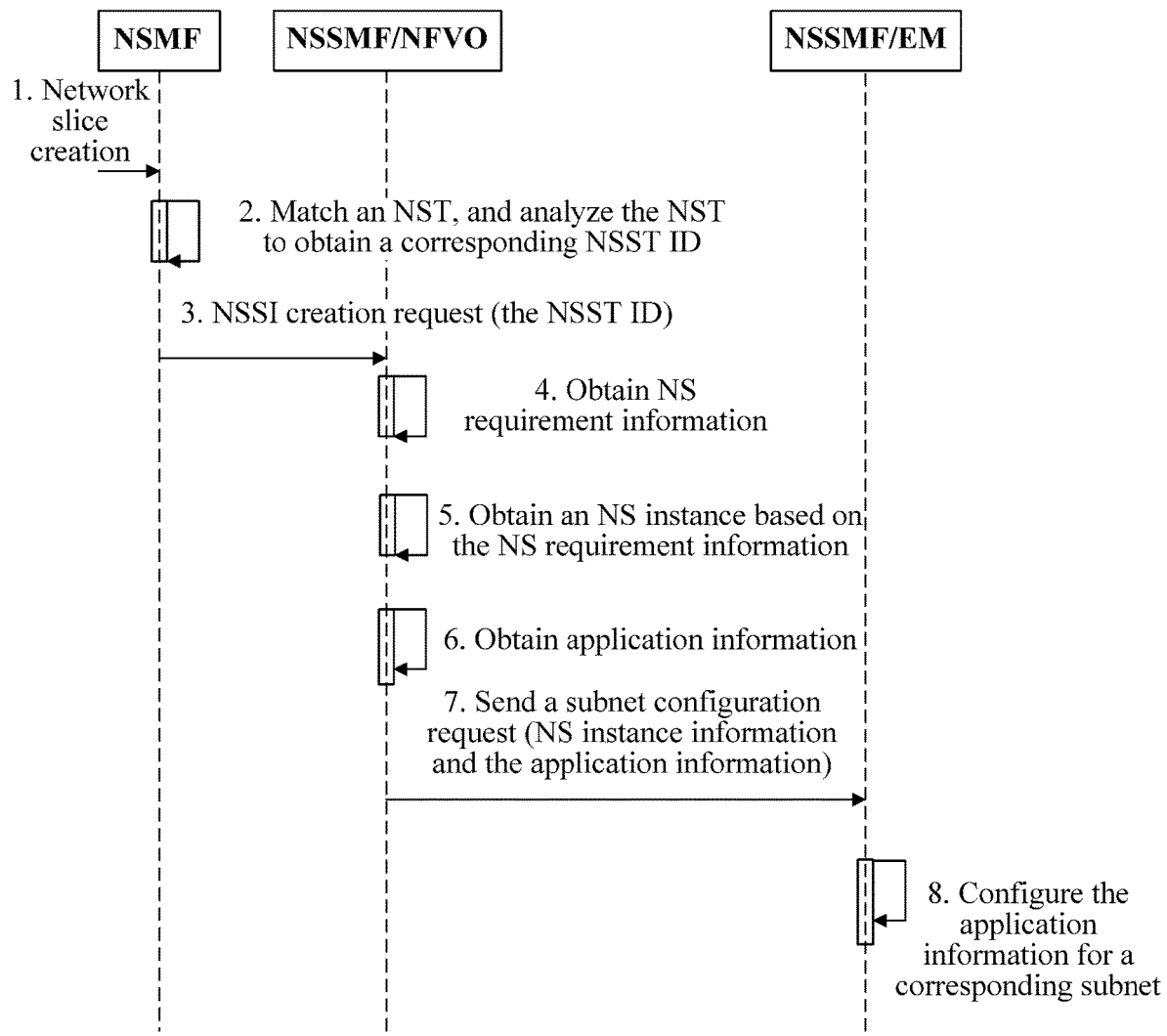
FIG. 8A is a schematic flowchart of still another network slice management method according to an embodiment of the present disclosure.

FIG. 8A is a schematic flowchart of this embodiment. In this embodiment, for example, a first management unit is an NFVO and a second management unit is an NSSMF.

For implementations of 8001 to 8003, refer to steps 401 to 403 in the foregoing embodiment.

8004: The NFVO obtains NS requirement information based on the identifier of the NSST.

For example, the NFVO obtains the NSST based on the identifier of the NSST, and the NSST includes the NS requirement information. The NSST is pre-stored in the NFVO or a database that can be accessed by the NFVO.

Optionally, the NS requirement information is one or more of the following information: an NS deployment specification (an NS flavor ID, which describes the NS deployment specification) and an NS instantiation level (NS instantiation level).

Optionally, the NS requirement information further includes network function requirement information. The network function requirement information is at least one of the following information: a network function descriptor (including a virtualized network function descriptor and a physical network function descriptor), virtualized network function requirement information (a VNF profile, which describes the virtualized network function requirement information), physical network function virtualized information (a PNF profile, which describes the physical network function requirement information), and a network function deployment specification (a VNF flavor ID, which describes the network function deployment specification).

8005: The NFVO instantiates or creates an NS instance based on the NS requirement information, and obtains NS instance information. For example, the NS instance information includes at least one the following information: an identifier of the NS instance, an identifier of a VNF instance, and an identifier of a PNF instance.

8006: The NFVO obtains application information based on the identifier of the NSST. For example, the NFVO obtains the NSST based on the identifier of the NSST, and the NSST is pre-stored in the NFVO or a database that can be accessed by the NFVO.

8007: The NFVO sends a configuration request to the NSSMF or an EM, where the request herein carries the NS instance information and application information, and the application information may be at least one of the following information: an application parameter, an application parameter configuration script or an application parameter file. Optionally, the configuration request may be at least one of the following: an NSSI configuration request, an NF configuration request, an NSSI MO creation request, an NF MO creation request, an NSSI MO configuration request, and an NF MO configuration request.

8008: The NSSMF or the EM configures the corresponding application information based on the configuration request.

For example, when the configuration request is an NSSI configuration request, the NSSMF configures corresponding application information for a corresponding NSSI.

Optionally, when the configuration request is an NF configuration request, the NSSMF configures corresponding application information for a corresponding NF.

Optionally, when the configuration request is an NSSI MO configuration request, the NSSMF configures corresponding application information for a corresponding NSSI MO.

Optionally, when the configuration request is an NF MO configuration request, the NSSMF configures corresponding application information for a corresponding NF MO.

Optionally, when the configuration request is an NSSI MO creation request, the NSSMF creates a corresponding NSSI MO and configures corresponding application information.

Optionally, when the configuration request is an NF MO creation request, the NSSMF creates a corresponding NF MO and configures corresponding application information.

Figure 9A:
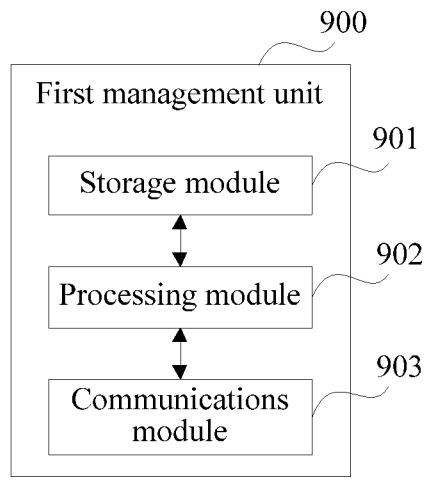
FIG. 9A is a schematic block diagram of a first management unit according to an embodiment of the present disclosure.

In a case of using an integrated module, FIG. 9A is a possible schematic structural diagram of a first management unit in the foregoing embodiment. The first management unit 900 includes a processing module 902 and a communications module 903. The processing module 902 is configured to perform control management on an action of the first management unit. For example, the processing module 902 is configured to support the first management unit in performing steps in FIG. 3 to FIG. 8 or is configured to perform another step process in the technology described in this specification. The communications module 903 is configured to support the first management unit in communicating with another network entity, for example, communicating with a second management unit. The first management unit may further include a storage module 901, configured to store program code and data of the first management unit.

The processing module 902 may be a processor or a controller, and for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processing module 902 can implement or perform various examples of logic blocks, modules, and circuits described with reference to content disclosed in the present disclosure. Alternatively, the processor may be a combination that implements a calculation function, for example, including one microprocessor or a combination of a plurality of microprocessors, or a combination of a DSP and a microprocessor. The communications module 903 may be a communications interface, a transceiver, a transceiver circuit, or the like. The communications interface is a general term and may include one or more interfaces. The storage module 901 may be a memory.

Figure 9B:
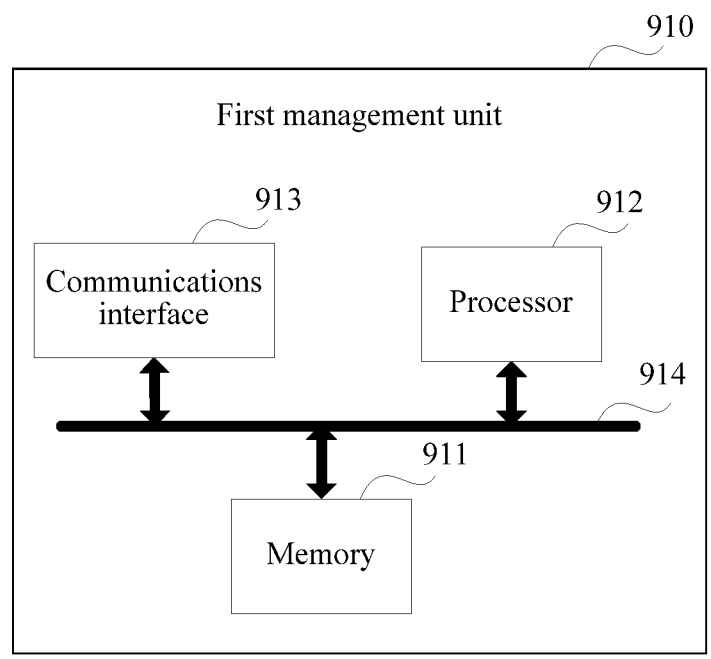
FIG. 9B is a schematic structural diagram of a first management unit according to an embodiment of the present disclosure.

When the processing module 902 is a processor, the communications module 903 is a communications interface, and the storage module 901 is a memory, the first management unit in this embodiment of the present disclosure may be a first management unit shown in FIG. 9B.

Referring to FIG. 9B, the first management unit 910 includes a processor 912, a communications interface 913, and a memory 911. Optionally, the first management unit 910 may further include a bus 914. The communications interface 913, the processor 912, and the memory 911 may be connected to one another using the bus 914. The bus 914 may be a peripheral component interconnect (PCI) bus, an extended industry standard architecture (EISA) bus, or the like. The bus 914 may be classified into an address bus, a data bus, a control bus, and the like. For ease of representation, the bus in FIG. 9B is represented using only one bold line, but this does not indicate that there is only one bus or only one type of bus.

The first management unit shown in FIG. 9A or FIG. 9B may be a network slice subnet management function NSSMF, a network slice management function, or another management unit having an NSSMF or an NSMF function.

Figure 10A:
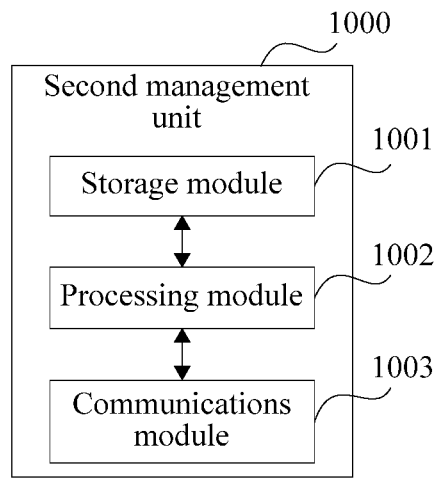
FIG. 10A is a schematic block diagram of a second management unit according to an embodiment of the present disclosure.

In a case of using an integrated module, FIG. 10A is a possible schematic structural diagram of a second management unit in the foregoing embodiment. The second management unit 1000 includes a processing module 1002 and a communications module 1003. The processing module 1002 is configured to perform control management on an action of the second management unit. For example, the processing module 1002 is configured to support the second management unit in performing steps in FIG. 8 and FIG. 9 and/or is configured to perform another process in the technology described in this specification. The communications module 1003 is configured to support the second management unit in communicating with a first management unit or another network entity. The second management unit may further include a storage module 1001 configured to store program code and data of the second management unit.

The processing module 1002 may be a processor or a controller, for example, may be a CPU, a general purpose processor, a DSP, an ASIC, an FPGA, or another programmable logic device, a transistor logic device, a hardware component, or any combination thereof. The processing module 1002 can implement or perform various examples of logic blocks, modules, and circuits described with reference to content disclosed in the present disclosure. Alternatively, the processor may be a combination that implements a calculation function, for example, including one microprocessor or a combination of a plurality of microprocessors, or a combination of a DSP and a microprocessor. The communications module 1003 may be a communications interface, a transceiver, a transceiver circuit, or the like. The communications interface is a general term and may include one or more interfaces. The storage module 1001 may be a memory.

Figure 10B:
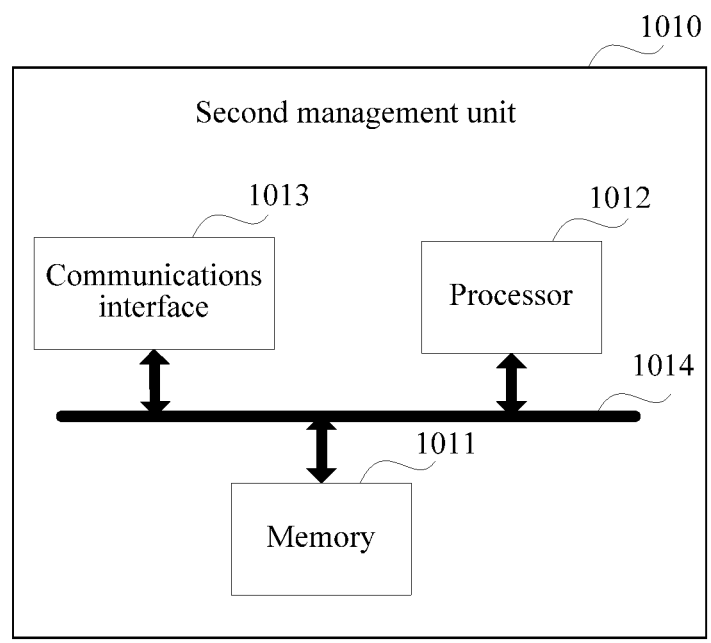
FIG. 10B is a schematic structural diagram of a second management unit according to an embodiment of the present disclosure.

When the processing module 1002 is a processor, the communications module 1003 is a communications interface, and the storage module 1001 is a memory, the second management unit in this embodiment of the present disclosure may be a second management unit shown in FIG. 10B.

Referring to FIG. 10B, the second management unit 1010 includes a processor 1012, a communications interface 1013, and a memory 1011. Optionally, the second management unit 1010 may further include a bus 1014. The communications interface 1013, the processor 1012, and the memory 1011 may be connected to one another using the bus 1014. The bus 1014 may be a PCI bus, an EISA bus, or the like. The bus 1014 may be classified into an address bus, a data bus, a control bus, and the like. For ease of representation, the bus in FIG. 10B is represented using only one bold line, but this does not indicate that there is only one bus or only one type of bus.

The second management unit shown in FIG. 10A or FIG. 10B may be an NSSMF, a DM, or a network function management unit (for example, an EM).

The methods or algorithm steps described with reference to the content disclosed in the embodiments of the present disclosure may be implemented in a hardware manner, or may be implemented in a manner of executing a software instruction by a processor. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other forms well-known in the art. A storage medium used as an example is coupled to the processor, such that the processor can read information from the storage medium, and can write information into the storage medium. Certainly, the storage medium may be a component of the processor. The processor and the storage medium may be located in an ASIC. In addition, the ASIC may be located in the first management unit or the second management unit. Certainly, the processor and the storage medium may be used as discrete assemblies in the first management unit or the second management unit.

A person skilled in the art should be aware that in one or more of the foregoing examples, the functions described in the embodiments of the present disclosure may be implemented using hardware, software, firmware, or any combination thereof. When this application is implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer.

The objectives, technical solutions, and beneficial effects of the embodiments of the present disclosure are further described in detail in the foregoing embodiments. It should be understood that, the foregoing descriptions are only example implementations of the embodiments of the present disclosure, but are not intended to limit the protection scope of the embodiments of the present disclosure. Any modification, equivalent replacement, or improvement made based on the technical solutions in the embodiments of the present disclosure shall fall within the protection scope of the embodiments of the present disclosure.

What is claimed is:

1. A network slice template management method, comprising:
   receiving, by a management unit, a subnet management request, wherein the subnet management request carries indication information of a subnet template, and wherein the indication information of the subnet template includes a network slice subnet template (NSST) identifier (ID);
   obtaining, by the management unit, network service descriptor (NSD) association information or an NSD based on the indication information of the subnet template;
   obtaining, by the management unit, a network service instance based on the NSD association information or the NSD; and
   associating, by the management unit, a network slice subnet instance (NSSI) with the network service instance, wherein the management unit includes a network slice subnet management function (NSSMF), and wherein obtaining, by the management unit, the NSD association information or the NSD comprises obtaining, by the NSSMF, the subnet template based on the indication information of the subnet template.

2. The method according to claim 1, wherein the subnet template comprises the NSD association information or the NSD.

3. The method according to claim 1, wherein the subnet management request further carries subnet requirement information, and wherein obtaining, by the management unit, the NSD association information or the NSD comprises obtaining, by the management unit, the NSD association information or the NSD based on the subnet requirement information and the indication information of the subnet template.

4. The method according to claim 1, wherein the NSD association information comprises one or more of an identifier, a deployment specification, an instantiation level, vendor information, or version information of the NSD.

5. The method according to claim 1, further comprising:
   creating, by the management unit, a subnet instance or a managed object of the subnet instance based on the subnet template after receiving the subnet management request; or
   sending a creation request to a third management unit based on the subnet template, wherein the creation request is to create the subnet instance or the managed object of the subnet instance.

6. The method according to claim 5, further comprising associating, by the management unit, the subnet instance with one of the network service instance or the managed object of the subnet instance.

7. The method according to claim 5, further comprising configuring, by the management unit, network service instance information in the managed object, wherein the network service instance information comprises at least one of an identifier of the network service instance, a specification of the network service instance, or an instantiation level of the network service instance.

8. The method according to claim 1, wherein obtaining the network service instance based on the NSD association information or the NSD comprises the NSSMF sending a creation request to a network function virtualization orchestration (NFVO).

9. The method according to claim 8, wherein the creation request carries the NSD association information, and wherein the NSSMF obtains the network service instance from the NFVO.

10. An apparatus, comprising:
    at least one processor; and
    a memory coupled to the at least one processor and storing programming instructions for execution by the at least one processor such that when executed, cause the apparatus to:
    receive a subnet management request, wherein the subnet management request carries indication information of a subnet template, wherein the indication information of the subnet template includes a network slice subnet template (NSST) identifier (ID);

obtain network service descriptor (NSD) association information or an NSD based on the indication information of the subnet template;

obtain a network service instance based on the NSD association information or the NSD; and associate a network slice subnet instance (NSSI) with the network service instance, wherein the apparatus includes a network slice subnet management function (NSSMF) configured to obtain the subnet template based on the indication information of the subnet template.

11. The apparatus according to claim 10, wherein the subnet template comprises the NSD association information or the NSD.

12. The apparatus according to claim 10, wherein the subnet management request further carries subnet requirement information, and wherein the at least one processor is configured to execute the programming instructions stored in the memory, to further cause the apparatus to obtain the NSD association information or the NSD based on the subnet requirement information and the indication information of the subnet template.

13. The apparatus according to claim 10, wherein the NSD association information comprises one or more of an identifier, a deployment specification, an instantiation level, vendor information, or version information of the NSD.

14. The apparatus according to claim 10, wherein the at least one processor is configured to execute the programming instructions stored in the memory, to further cause the apparatus to associate a subnet instance with one of the network service instance or a managed object (MO) of the subnet instance.

15. The apparatus according to claim 10, wherein the NSSMF is configured to use the network slice template to deploy a network slice instance.

16. The apparatus according to claim 10, wherein the at least one processor is configured to execute the programming instructions stored in the memory, to further cause the apparatus to send a creation request to a network function virtualization orchestration (NFVO) and obtain the network service instance from the NFVO, and wherein the creation request carries the NSD association information.

17. A system, comprising:

a network function virtualization orchestration (NFVO) including a memory storing instructions and a processor configured to execute the instructions to cause the NFVO to create a network service instance and send corresponding network service instance information to a first management unit; and a network slice subnet management function (NSSMF) configured to:
  receive a subnet management request, wherein the subnet management request carries indication information of a subnet template, and wherein the indication information of the subnet template includes a network slice subnet template (NS ST) identifier (ID);
  obtain the subnet template based on the indication information of the subnet template;
  obtain network service descriptor (NSD) association information or an NSD based on the indication information of the subnet template;
  obtain the network service instance based on the NSD association information or the NSD;
  send a creation request to the NFVO, wherein the creation request comprises the NSD association information; and
  associate a network slice subnet instance (NSSI) with the network service instance.

18. The system according to claim 17, wherein the NSSMF is further configured to obtain the network service instance from the NFVO.

19. The system according to claim 17, wherein the NSD association information comprises one or more of an identifier, a deployment specification, an instantiation level, vendor information, or version information of the NSD.

20. The system according to claim 17, wherein the NSSMF is further configured to associate the NSSI with a managed object (MO) of the NSSI.

* * * * *

UNITED STATES PATENT AND TRADEMARK OFFICE
CERTIFICATE OF CORRECTION

PATENT NO. : 11,296,957 B2
APPLICATION NO. : 16/574565
DATED : April 5, 2022
INVENTOR(S) : Ruiyue Xu and Kai Zhang Page 1 of 1

It is certified that error appears in the above-identified patent and that said Letters Patent is hereby corrected as shown below:

On the Title Page

(56) References Cited, U.S. Patent Documents: "10,355,989 B1 7/2019 Panchai" should read "10,355,989 B1 7/2019 Panchal"

In the Claims

Claim 17, Column 22, Line 17: "template (NS ST)" should read "template (NSST)"

Signed and Sealed this
Seventh Day of June, 2022

Katherine Kelly Vidal
*Director of the United States Patent and Trademark Office*